United States Patent Office 3,284,412
Patented Nov. 8, 1966

3,284,412
METHOD OF THE PREPARATION OF STABLE ALDEHYDE POLYMERS
Junji Furukawa and Takeo Saegusa, Kyoto, and Shigeyasu Ohta, Takatsuki, Japan, assignors to Faidan Hojin Nihon Kagaku Seni Kenyusho, Kyoto, Japan, an incorporated foundation of Japan
No Drawing. Filed Jan. 21, 1963, Ser. No. 252,602
2 Claims. (Cl. 260—67)

The present invention relates to the polymerization of aldehydes, and more particularly to the production of stable polyaldehydes.

Aldehyde polymers prepared by heretofore known methods are thermally unstable. They decompose even at room temperature to form aldehyde monomers which are further oxidized by air or oxygen to produce acetic acid which induces further an acid decomposition. Therefore even though aldehyde polymers of a high degree of polymerization may be obtained, yet the practical application of polyaldehyde has not been realized.

After studying the method of polymerization in view of stabilization of the produced polyaldehydes, the inventors have found a novel method for the production of stable aldehyde polymers.

The present invention is characterized in that aldehydes are polymerized by a catalyst in the presence of an olefin monomer to obtain stable adehyde polymers.

Catalysts for polymerization of aldehydes to be used in the invention are complexes or reaction products between organometallic compounds of elements of Groups I to III of the Periodic Table or a mixture of such compounds with a suitable amount of water and metal halides or oxides of elements of Groups II to VI of the Periodic Table. Furthermore the olefin which is particularly necessary for the stabilization may be regarded also as a component of the polymerization catalysts, since such an olefin is highly adsorbed by the above described complexes or reaction products or produces a new complex or reaction product, which is recognized as a component of the catalyst for the polymerization of aldehydes.

Examples of the organometallic compounds of elements of Groups I to III of the Periodic Table are, butyllithium, amylsodium, phenylsodium, dimethylmagnesium, diethylmagnesium, dimethylzinc, dibutylzinc, diethylmercury, butylmagnesium chloride, phenylmagnesium bromide, triethylaluminum, tributylaluminum, trihexylaluminum, diethylaluminum monochloride, diethylaluminum monobromide, dibutylaluminum monochloride, ethylaluminum dichloride, butylaluminum dichloride, diethylaluminum ethoxide, dibutylaluminum ethoxide, diethylaluminum, isopropoxide and dibutylaluminum isopropoxide. When adding water to such organometallic compounds, the ratio between water and organometallic compound is 1:1 or less.

Examples of the elements of Groups II to VI of the Periodic Table are magnesium, calcium, aluminum, titanium, zirconium, hafnium, thorium, uranium, vanadium, columbium, tantalum, chromium, molybdenum and tungsten. As the catalyst component they may be made of halides or oxides of the above described metal elements, examples being calcium chloride, magnesium chloride, aluminum chloride, titanium tetrachloride, titanium trichloride, zirconium tetrachloride, vanadium tetra or trichloride, vanadium oxychloride, and chromium trichloride etc. And also the combination of more than two of these chlorides or oxides gives, sometimes a catalyst having a higher activity. Mole ratio of the chlorides or oxides to the organometallic compounds is generally 0.01–2.0, but sometimes it may be varied over this range.

It has heretofore been known that aldehydes are polymerized by organometallic compounds or the mixture of such compounds with water. On the other hand, it has been well known that complexes or reaction products produced by adding halides of elements of Groups IV to VI-a of the Periodic Table to organometallic compounds of elements of Groups I to III of the Periodic Table polymerize olefin.

In the invention it has been found that the novel complexes or reaction products consisting of organometallic compounds of elements of Groups I to III of the Periodic Table or a mixture of such compounds with water, metal chlorides or oxides of elements of Groups II to VI of the Periodic Table and olefins polymerize aldehydes and give stable aldehyde polymers. Such a fact has never been known prior to the invention. The aldehyde polymers thus obtained contain a block of polyolefin chain at the end, which presumably bring the effect of stabilization.

Olefins used in the invention include α-olefins such as ethylene, propylene, n-butene-1, n-pentene-1, n-hexene-1, styrene and dienes such as butadiene or isoprene. Mole ratio of olefins to organometallic compounds is from 1 to 100 or more.

The catalysts can be prepared by various methods. For example, the organometallic compounds may be added to an inert solvent, to the mixture of which is added the above described metal halides or oxides, and then an olefin is absorbed on the reaction product to produce the catalyst, or the catalyst components may be introduced into an inert solvent by changing the addition order. Furthermore olefins may also be introduced at the same time with the aldehyde monomer in the gaseous or liquid state. Moreover when the absorption rate of olefin is slow, an olefin may be adsorbed upon the catalyst under a pressure. A temperature for preparing the catalysts is within a broad range from −78° C. to +150° C. and a preferable temperature varies according to choice of the catalyst component. For example, when using titanium tetrachloride, triethylaluminum and propylene, any temperature from −78° C. to 100° C. may be used for the preparation of the catalyst, but when chromium trichloride instead of titanium tetrachloride is used, a desirable catalyst may be obtained by using a high temperature from 100° C. to 140° C. and an increased pressure of propylene more than a few atmospheric pressures. The catalysts are generally prepared under nitrogen atmosphere in an inert solvent. As the solvent, aromatic or aliphatic hydrocarbons such as benzene, toluene, heptane and hexane may be used.

The polymerization is carried out by introducing aldehyde as the gaseous or liquid phase into the solvent containing the catalyst. The polymerization temperature is lower than −40° C. Stirring is not particularly necessary but generally more desirable results may be obtained by stirring. When preparing the catalyst at a lower temperature, the preparation of the catalyst and the polymerization may be effected continuously in the presence of both olefins and the aldehyde monomer and in this case it is preferable to stir the mixture thoroughly.

Aldehydes to be polymerized according to the invention are aliphatic saturated aldehydes such as acetaldehyde, propionaldehyde and butyraldehyde, unsaturated aldehydes such as acrolein or crotonaldehyde and aromatic aldehydes such as benzaldehyde.

*Example 1*

To 55 cc. of n-heptane were added 0.1 cc. of $TiCl_4$ and 0.25 cc. of $Al(C_2H_5)_3$, and the reaction mixture was stirred thoroughly, and then the mixture was allowed to stand to give black precipitates. The precipitates were separated from the supernatant liquid and washed three times with each 50 cc. of n-heptane to remove excess of $Al(C_2H_5)_3$ and the soluble product. The precipitates were suspended in 50 cc. of n-heptane, and about 500 cc. of gaseous propylene were added to the suspension at a room temperature. The reaction product was cooled to $-78°$ C., to which 10 cc. (as liquid) of acetaldehyde were added by distillation. The polymerization was carried out at $-78°$ C. for 48 hours and the polymeric product was obtained in 31.2% yield, which consisted of 11.8% of methanol-soluble part, 6.3% of chloroform-soluble part and 13.1% of chloroform-insoluble part. This experiment was made with a system of $Al(C_2H_5)_3$–$TiCl_4$–propylene, and the stability of the polymer product was compared with that of polymers prepared with a catalytic system of $Al(C_2H_5)_3$ alone. The decomposition percentage in air at 100° C. during one hour was measured. The values are shown in the following table.

|  | $CH_3OH$ soluble part | $CHCl_3$ soluble part | Insoluble part |
|---|---|---|---|
|  | Percent | Percent | Percent |
| Unstabilized polymer [1] | 97 | 94 | 90 |
| Stabilized Polymer [2] | 63 | 41 | 34 |

[1] Prepared with $Al(C_2H_5)_3$ catalyst.
[2] Prepared with catalytic system of $Al(C_2H_5)_3$–$TiCl_4$–propylene.

From this experiment it is clear that the polymer prepared by $Al(C_2H_5)_3$–$TiCl_4$–propylene was more stable than that by $Al(C_2H_5)_3$ alone.

*Example 2*

To 100 cc. of n-hexane were added 1.0 mmole of $TiCl_4$ and 1.5 mmole of $C_4H_9Li$, and the mixture was cooled to $-78°$ C., to which 1 cc. of liquid propylene was added. To the mixture thus prepared, 0.3 mole of acetaldehyde was fed by distillation and the polymerization was carried out at $-78°$ C. for 50 hours. The yield of the polymeric product was 39.5%; that of methanol-soluble part being 8.7%, that of chloroform-soluble part being 19.1% and that of insoluble part being 11.7%. The decomposition percentages by the same procedure as described in Example 1 were 52%, 34% and 30%, respectively, from which the effect of stabilization was clearly demonstrated.

What we claim is:
1. A method for producing thermally stable polymers of aliphatic aldehydes having from two to four carbon atoms including polymerizing said aliphatic aldehyde in the presence of an ethylenically unsaturated hydrocarbon having from two to eight carbon atoms and a catalyst system consisting of an organometallic compound selected from the group consisting of organometallic compounds of lithium, sodium, magnesium, zinc and mercury, having the general formula

$$RM$$

wherein R is an aliphatic hydrocarbon radical, M is one of said metals and organometallic compounds of aluminum having the general formula $$R_{3-n}AlX_n$$

wherein R is an aliphatic hydrocarbon radical and X is a member selected from the group consisting of a halogen and an alkyloxy radical, and $n$ is an integer from 0–2; and halides of metals belonging to groups II–VI of the Periodic Table by using a liquid hydrocarbon as a solvent, the mole ratio of said halide to said organometallic compound being in the range of from 0.01 to 2.0, said polymerization being effected at a temperature of less than $-40°$ C.

2. The process of claim 1, wherein the catalyst system is mixed with the ethylenically unsaturated hydrocarbon before the polymerization reaction.

References Cited by the Examiner

UNITED STATES PATENTS 2,930,807  3/1960  Case _____ 260—429
2,996,459  8/1961  Andersen et al. _____ 252—429
3,029,231  4/1962  Amerongen _____ 260—87.5

FOREIGN PATENTS 870,775  6/1961  Great Britain.
876,956  9/1961  Great Britain.
220,367  3/1962  Austria.

OTHER REFERENCES

Fujii et al.; Makromolecular Chemie, 40 (1960), pgs. 226–8.

Derwent Belgian Patents Report, No. 75A, (May 1961), p. A7–8.

Furukawa et al.; Chemical Abstracts, 55, 18166 d–e (1961).

WILLIAM H. SHORT, *Primary Examiner.*

L. M. MILLER, *Assistant Examiner.*